(12) United States Patent
Zhang et al.

(10) Patent No.: US 10,003,123 B2
(45) Date of Patent: Jun. 19, 2018

(54) FULL-DUPLEX ANTENNA AND MOBILE TERMINAL

(71) Applicant: Huawei Technologies Co., Ltd., Shenzhen (CN)

(72) Inventors: Junping Zhang, Shenzhen (CN); Zhice Yang, Hong Kong (HK); Qian Zhang, Hong Kong (HK)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 110 days.

(21) Appl. No.: 15/135,830

(22) Filed: Apr. 22, 2016

(65) Prior Publication Data

US 2016/0240912 A1 Aug. 18, 2016

Related U.S. Application Data

(63) Continuation of application No. PCT/CN2013/089991, filed on Dec. 19, 2013.

(51) Int. Cl.
*H01Q 1/24* (2006.01)
*H01Q 21/28* (2006.01)
(Continued)

(52) U.S. Cl.
CPC .............. *H01Q 1/243* (2013.01); *H01Q 1/24* (2013.01); *H01Q 1/52* (2013.01); *H01Q 1/525* (2013.01); *H01Q 21/28* (2013.01); *H04L 5/1461* (2013.01)

(58) Field of Classification Search
CPC .......... H01Q 1/243; H01Q 1/52; H01Q 21/28; H01Q 1/525
See application file for complete search history.

(56) References Cited

U.S. PATENT DOCUMENTS 7,817,641 B1 * 10/2010 Khandani ............ H04B 7/0682
370/395.4
8,160,664 B1 4/2012 Venugopalachary et al.
(Continued)

FOREIGN PATENT DOCUMENTS

CN 101459441 A 6/2009
CN 103117970 A 5/2013
(Continued)

OTHER PUBLICATIONS

Aryafar, E. et al., "MIDU: Enabling MIMO Full Duplex," MobiCom'12, Aug. 22-26, 2012, 12 pages.
(Continued)

*Primary Examiner* — Hoang Nguyen
(74) *Attorney, Agent, or Firm* — Slater Matsil, LLP

(57) ABSTRACT

A full-duplex antenna includes a receive antenna, which is an omnidirectional antenna. A first transmit antenna is disposed on one side of the receive antenna and is a directional antenna. A reverse direction of a main lobe of a radiation pattern of the first transmit antenna points to the receive antenna. A second transmit antenna is disposed on the other side of the receive antenna. A distance between the second transmit antenna and the receive antenna is equal to a distance between the first transmit antenna and the receive antenna. The second transmit antenna is a directional antenna, and a reverse direction of a main lobe of a radiation pattern of the second transmit antenna points to the receive antenna.

20 Claims, 5 Drawing Sheets

(51) Int. Cl.
*H01Q 1/52* (2006.01)
*H04L 5/14* (2006.01)

(56) References Cited

U.S. PATENT DOCUMENTS

| | | |
|---|---|---|
| 2006/0003697 A1 | 1/2006 | Asai et al. |
| 2010/0220022 A1 | 9/2010 | Yoon et al. |
| 2012/0201153 A1 | 8/2012 | Bharadia et al. |
| 2012/0201173 A1* | 8/2012 | Jain ................. H04B 1/525 370/277 |
| 2013/0106667 A1* | 5/2013 | Fenn ................. H01Q 1/525 343/793 |

FOREIGN PATENT DOCUMENTS

| | | |
|---|---|---|
| JP | 2006-20211 A | 1/2006 |
| JP | 2006-41577 A | 2/2006 |
| KR | 20060070790 A | 6/2006 |
| RU | 2100878 C1 | 12/1997 |
| WO | 2006068416 A1 | 6/2006 |
| WO | 2012106263 A1 | 8/2012 |
| WO | 2013074004 A1 | 5/2013 |
| WO | 2013120087 A1 | 8/2013 |

OTHER PUBLICATIONS

Bharadia, D. et al., "Full Duplex Radios," ACM Special Interest Group on Data Communication (SIGCOMM), Aug. 12-16, 2013, 12 pages.
Choi, J. et al., "Achieving Single Channel, Full Duplex Wireless Communication," Proceedings of the 16th Annual International Conference on Mobile Computing and Networking, Mobicom 2010, Sep. 2010, 12 pages.
Duarte, M. et al., "Full-Duplex Wireless Communications Using Off-The-Shel Radios: Feasibility and First Results," Forty Fourth Asilomar Conference on Signals, Systems and Computers, Nov. 7-10, 2010, pp. 1558-1562.
Hong, S. et al., "Picasso: Flexible RF and Spectrum Slicing," SIGCOMM'12, Aug. 13-17, 2012, 12 pages.
Jain, M. et al., "Practical, Real-time, Full Duplex Wireless," MobiCom'11, Sep. 19-23, 2011, 12 pages.

* cited by examiner

FULL-DUPLEX ANTENNA AND MOBILE TERMINAL

This application is a continuation of International Patent Application No. PCT/CN2013/089991, filed on Dec. 19, 2013, which is hereby incorporated by reference in its entirety.

TECHNICAL FIELD

This application relates to the field of communications, and in particular, to a full-duplex antenna and a mobile terminal.

BACKGROUND

Wireless full duplex refers to a technology that a wireless transceiver implements simultaneous receiving and sending. In designing of a conventional transceiver in a wireless network, to implement full duplex, either it is required to use two independent channels to separately perform sending and receiving, or it is required to use a time division system to separate timeslots for receiving and sending. In both of the two technologies, a wireless spectrum is not used effectively. In a case in which same bandwidth is occupied, the two full-duplex technologies fail to improve transmission efficiency of an entire communications system essentially.

A biggest problem in implementing full duplex at a same time and at a same frequency lies in that, when each of transmit antennas of two parties simultaneously sends a signal to a receive antenna of the other party, the sent signal is not only received by the receive antenna of the other party but also received by a receive antenna of the own party. Moreover, a distance from the receive antenna of the own party to the transmit antenna of the own party is much shorter than a distance from the receive antenna of the own party to a transmit antenna of the other party, and the signal fades in a transmission process. Therefore, the signal received by the receive antenna of the own party and sent by the transmit antenna of the own party is much stronger than the signal received by the receive antenna of the own party and sent by the transmit antenna of the other party, thereby submerging the signal sent by the transmit antenna of the other party.

Referring to FIG. 1, to improve utilization of the wireless spectrum, the prior art provides a full-duplex antenna, which can perform full-duplex transmission at a same frequency and in a same timeslot without affecting a signal-to-noise ratio of a receive signal of the full-duplex antenna. The full-duplex antenna includes a first transmit antenna 111, a receive antenna 113, and a second transmit antenna 115. All of the first transmit antenna 111, the receive antenna 113, and the second transmit antenna 115 are omnidirectional antennas. The first transmit antenna 111 is disposed on one side of the receive antenna 113, and the second transmit antenna 115 is disposed on the other side of the receive antenna 113. Moreover, a distance between the first transmit antenna 111 and the receive antenna 113 is d, and a distance between the second transmit antenna 115 and the receive antenna 113 is $d+\lambda/2$, where $\lambda$ represents a wavelength.

Referring to FIG. 2, the full-duplex antenna provided in the prior art is applied to each of a first communication party 210 and a second communication party 220. The first communication party 210 is provided with a first transmit antenna 211, a first receive antenna 213, and a second transmit antenna 215. The second communication party 220 is provided with a third transmit antenna 221, a second receive antenna 223, and a fourth transmit antenna 225.

On one hand, the first communication party 210 needs to send data to the second communication party 220, and therefore, the first transmit antenna 211 and the second transmit antenna 215 simultaneously send a same signal to the external. Moreover, both of the signals sent by the first transmit antenna 211 and the second transmit antenna 215 are simultaneously sent to the first receive antenna 213 and the second receive antenna 223. However, the first receive antenna 213 is not desired to receive the signals sent by the first transmit antenna 211 and the second transmit antenna 215. Moreover, distances between the first receive antenna 213 and the first transmit antenna 211 and between the first receive antenna 213 and the second transmit antenna 215 are much shorter than distances between the second receive antenna 223 and the first transmit antenna 211 and between the second receive antenna 223 and the second transmit antenna 215.

Therefore, if the signals sent by the first transmit antenna 211 and the second transmit antenna 215 are received by the first receive antenna 213, strong interference is caused to the first receive antenna 213. However, a distance between the first transmit antenna 211 and the first receive antenna 213 is d, and a distance between the second transmit antenna 215 and the first receive antenna 213 is $d+\lambda/2$, that is, the two distances differ by a half of a wavelength. Therefore, the signal sent by the first transmit antenna 211 to the first receive antenna 213 and the signal sent by the second transmit antenna 215 to the first receive antenna 213 are exactly the same in signal strength and reverse in phase, and are mutually canceled. Therefore, the signals sent by the first transmit antenna 211 and the second transmit antenna 215 do not cause strong interference to the first receive antenna 213. The signals sent by the first transmit antenna 211 and the second transmit antenna 215 are reflected and refracted multiple times in space transmission, and transmitted to the second receive antenna 223 through multiple paths (a multipath effect), and are received by the second receive antenna 223.

On the other hand, the second communication party 220 needs to send data to the first communication party 210, and therefore, the third transmit antenna 221 and the fourth transmit antenna 225 simultaneously send a same signal to the external. Moreover, both of the signals sent by the third transmit antenna 221 and the fourth transmit antenna 225 are simultaneously sent to the second receive antenna 223 and the first receive antenna 213. However, the second receive antenna 223 is not desired to receive the signals sent by the third transmit antenna 221 and the fourth transmit antenna 225. Moreover, distances between the second receive antenna 223 and the third transmit antenna 221 and between the second receive antenna 223 and the fourth transmit antenna 225 are much shorter than distances between the first receive antenna 213 and the third transmit antenna 221 and between the first receive antenna 213 and the fourth transmit antenna 225. Therefore, if the signals sent by the third transmit antenna 221 and the fourth transmit antenna 225 are received by the second receive antenna 223, strong interference is caused to the second receive antenna 223.

However, a distance between the third transmit antenna 221 and the second receive antenna 223 is d, and a distance between the fourth transmit antenna 225 and the second receive antenna 223 is $d+\lambda/2$. Therefore, the signal sent by the third transmit antenna 221 to the second receive antenna 223 and the signal sent by the fourth transmit antenna 225 to the second receive antenna 223 are exactly the same in signal strength and reverse in phase, and are mutually canceled. Therefore, the signals sent by the third transmit antenna 221 and the fourth transmit antenna 225 do not cause strong interference to the second receive antenna 223. The signals sent by the third transmit antenna 221 and the fourth transmit antenna 225 are reflected and refracted multiple times in space transmission, and transmitted to the first receive antenna 213 through multiple paths (the multipath effect), and are received by the first receive antenna 213.

The first transmit antenna 211 and the second transmit antenna 215 of the first communication party 210 do not affect the first receive antenna 213, and the third transmit antenna 221 and the fourth transmit antenna 225 of the second communication party 220 do not affect the second receive antenna 223. Therefore, the first communication party 210 and the second communication party 220 can perform bidirectional data transmission at a same time and at a same frequency.

However, in this manner, when the distance between the first transmit antenna 111 and the receive antenna 113 is d, the distance between the second transmit antenna 115 and the receive antenna 113 must be d+λ/2. Therefore, when a used wavelength changes, the distance between the second transmit antenna 115 and the receive antenna 113 must change. Moreover, a wideband signal includes multiple frequencies, and wavelengths corresponding to the frequencies are all different. However, the distance between the second transmit antenna 115 and the receive antenna 113 can be set according to only one of the wavelengths. Therefore, the manner cannot be applied to the wideband signal.

SUMMARY

This application provides a full-duplex antenna and a mobile terminal, so that when a used frequency changes, a distance between antennas does not need to be reset; moreover, the full-duplex antenna can also be applied to a wideband signal.

A first aspect of this application provides a full-duplex antenna, including a receive antenna; a first transmit antenna, disposed on one side of the receive antenna, where the first transmit antenna is a directional antenna, and a reverse direction of a main lobe of a radiation pattern of the first transmit antenna points to the receive antenna; and a second transmit antenna, disposed on the other side of the receive antenna, where a distance between the second transmit antenna and the receive antenna is equal to a distance between the first transmit antenna and the receive antenna, the second transmit antenna is a directional antenna, and a reverse direction of a main lobe of a radiation pattern of the second transmit antenna points to the receive antenna.

With reference to the first aspect, in a first possible implementation manner of the first aspect of this application, a polarization direction in which the receive antenna receives a signal transmitted by the first transmit antenna and a polarization direction in which the receive antenna receives a signal transmitted by the second transmit antenna are perpendicular to each other.

With reference to the first aspect, in a second possible implementation manner of the first aspect of this application, the full-duplex antenna further includes a signal generator, where a first output end of the signal generator is connected to the first transmit antenna by means of a first conducting wire, a second output end of the signal generator is connected to the second transmit antenna by means of a second conducting wire, and the signal generator is configured to generate two channels of transmit signals having a same amplitude and reverse phases and separately send the two channels of transmit signals to the first transmit antenna and the second transmit antenna.

With reference to the second possible implementation manner of the first aspect, in a third possible implementation manner of the first aspect of this application, the first conducting wire and the second conducting wire have an equal length.

With reference to the second possible implementation manner of the first aspect, in a fourth possible implementation manner of the first aspect of this application, the full-duplex antenna further includes a digital interference canceller, where the digital interference canceller is configured to receive a receive signal received from the receive antenna, and the digital interference canceller is configured to cancel interference signals received by the receive antenna from the first transmit antenna and the second transmit antenna.

With reference to the fourth possible implementation manner of the first aspect, in a fifth possible implementation manner of the first aspect of this application, the full-duplex antenna includes multiple groups of receive and transmit channels, where each group of receive and transmit channel includes the receive antenna, the first transmit antenna, the second transmit antenna, and the signal generator, a first end of the digital interference canceller is configured to receive a receive signal that is output by the receive antenna in each group, a second end of the digital interference canceller is configured to output a transmit signal to the signal generator that is in each group, and distances from the first transmit antenna and the second transmit antenna that are in a same group of receive and transmit channel to any receive antenna are the same.

With reference to the fourth possible implementation manner of the first aspect, in a sixth possible implementation manner of the first aspect of this application, the full-duplex antenna includes an analog-to-digital converter, where one end of the analog-to-digital converter is connected to the receive antenna, and the other end is connected to the digital interference canceller; and the analog-to-digital converter is configured to convert an analog receive signal received by the receive antenna into a digital receive signal and send the digital receive signal to the digital interference canceller.

With reference to the fourth possible implementation manner of the first aspect, in a sixth possible implementation manner of the first aspect of this application, the full-duplex antenna includes a digital-to-analog converter, where one end of the digital-to-analog converter is connected to the signal generator, and the other end is connected to the digital interference canceller; and the digital-to-analog converter is configured to convert a digital transmit signal sent by the digital interference canceller into an analog transmit signal and send the analog transmit signal to the signal generator.

With reference to the first aspect, in a seventh possible implementation manner of the first aspect of this application, the radiation patterns of the first transmit antenna and the second transmit antenna have no side lobe.

With reference to the first aspect, in an eighth possible implementation manner of the first aspect of this application, after a direction of the main lobe of radiation of the first transmit antenna and a direction of the main lobe of radiation of the second transmit antenna are overlapped, omnidirectional radiation is implemented, where the omnidirectional radiation enables the transmit signal to be received in any direction of directions of 360 degrees.

A second aspect of this application provides a mobile terminal, including a full-duplex antenna, where the full-duplex antenna is any full-duplex antenna described above.

According to the foregoing solutions, bidirectional communication can be implemented in a same timeslot and at a same frequency; moreover, a first transmit antenna and a second transmit antenna are separately disposed on two sides of a receive antenna, and moreover, both of the first transmit antenna and the second transmit antenna are directional antennas, and reverse directions of main lobes of radiation patterns of the two transmit antennas point to the receive antenna, thereby implementing interference cancellation. Compared with the existing method in which interference cancellation is implemented only if a distance from the second transmit antenna to the receive antenna and a distance from the first transmit antenna to the receive antenna must differ by a half of a wavelength, this application is not limited by the wavelength. Even if a used frequency changes, a distance between antennas does not need to be reset. Moreover, the full-duplex antenna can also be applied to a wideband signal.

DETAILED DESCRIPTION OF ILLUSTRATIVE EMBODIMENTS

In the following description, to illustrate rather than limit, specific details such as a particular system structure, interface, and technology are provided to make a thorough understanding of this application. However, a person skilled in the art should know that this application may be practiced in other embodiments without these specific details. In other cases, detailed descriptions of well-known apparatuses, circuits, and methods are omitted, so that this application is described without being obscured by unnecessary details.

Figure 3:
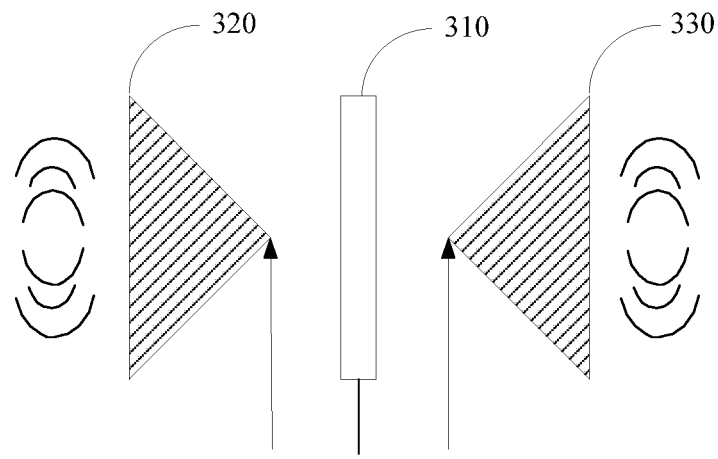
FIG. 3 is a schematic structural diagram of an implementation manner of a full-duplex antenna in this application.

FIG. 3 is a schematic structural diagram of an implementation manner of a full-duplex antenna in this application. The full-duplex antenna in this application includes a receive antenna 310, a first transmit antenna 320, and a second transmit antenna 330.

The receive antenna 310 is configured to receive a signal sent by the other party.

The first transmit antenna 320 is disposed on one side of the receive antenna 310, the first transmit antenna 320 is a directional antenna, and a reverse direction of a main lobe of a radiation pattern of the first transmit antenna 320 points to the receive antenna 310.

The second transmit antenna 330 is disposed on the other side of the receive antenna 310, a distance between the second transmit antenna 330 and the receive antenna 310 is equal to a distance between the first transmit antenna 320 and the receive antenna 310, the second transmit antenna 330 is a directional antenna, and a reverse direction of a main lobe of a radiation pattern of the second transmit antenna 330 points to the receive antenna 310. It may be understood that, "equal to" in that a distance between the second transmit antenna 330 and the receive antenna 310 is equal to a distance between the first transmit antenna 320 and the receive antenna 310 should not be understood as "absolutely equal to" in a mathematical sense but "equal to" that is allowed within an engineering error range.

According to the foregoing solution, a first transmit antenna and a second transmit antenna are separately disposed on two sides of a receive antenna, and moreover, both of the first transmit antenna and the second transmit antenna are directional antennas, and reverse directions of main lobes of radiation patterns of the two transmit antennas point to the receive antenna, thereby implementing interference cancellation. Compared with the existing method in which interference cancellation is implemented only if a distance from the second transmit antenna to the receive antenna and a distance from the first transmit antenna to the receive antenna must differ by a half of a wavelength, this application is not limited by the wavelength. Even if a used frequency changes, a distance between antennas does not need to be reset. Moreover, the full-duplex antenna can also be applied to a wideband signal.

In long-term research and development, it is further found by a person skilled in the art that, if it is required that a signal sent by a transmit antenna of the other party can be recognized, it is required to cancel a signal, which is sent by a transmit antenna of the own party and received by a receive antenna of the own party, to a power level of white noise. A power level of the signal sent by the transmit antenna of the own party is 15 to 20 dBm, and the power level of white noise is −90 dBm; therefore, it is required to attenuate the signal, which is sent by the transmit antenna of the own party, by at least 15 dBm−(−90 dBm)=105 dBm at the receive antenna.

Figure 1:
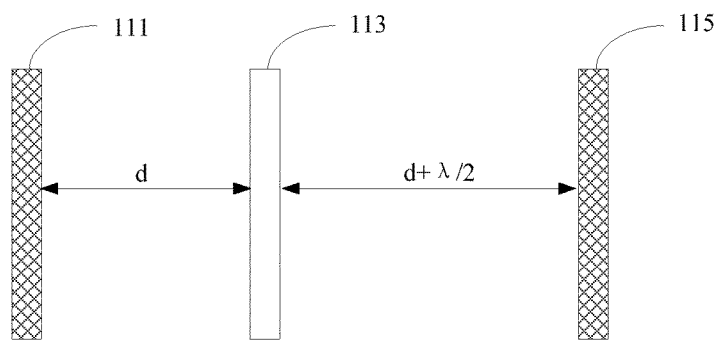
FIG. 1 is a schematic structural diagram of an implementation manner of a full-duplex antenna in the prior art.
Figure 2:
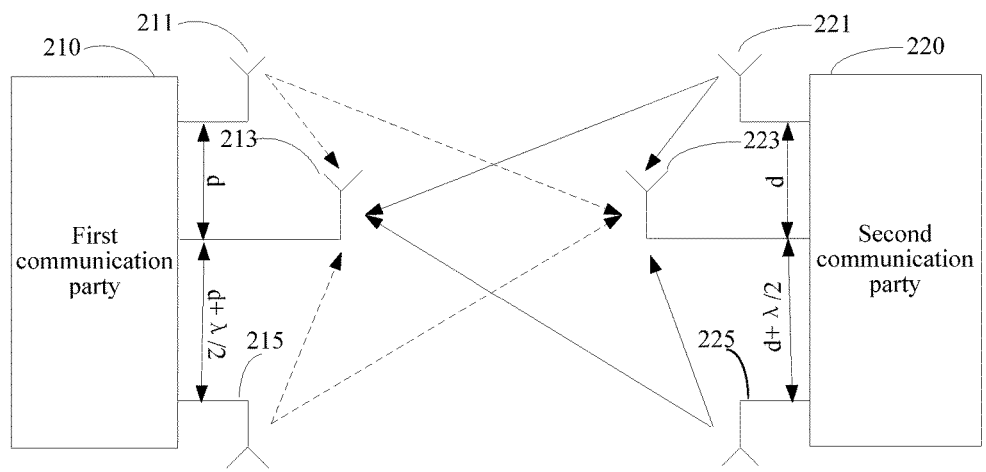
FIG. 2 is a schematic diagram of bidirectional transmission performed by a full-duplex antenna in the prior art.

When an antenna shown in FIG. 1 is used, to reduce impact of a first transmit antenna 111 and a second transmit antenna 115 on a receive antenna 113, sufficient transmission attenuation can be provided only if a distance between the first transmit antenna 111 and the receive antenna 113 and a distance between the second transmit antenna 115 and the receive antenna 113 are longer than 20 centimeters. Therefore, the distance between the first transmit antenna 111 and the receive antenna 113 and the distance between the second transmit antenna 115 and the receive antenna 113 need to be set to be relatively far, and the antenna in FIG. 1 is not applicable to a relatively small device such as a mobile communication device.

Figure 4:
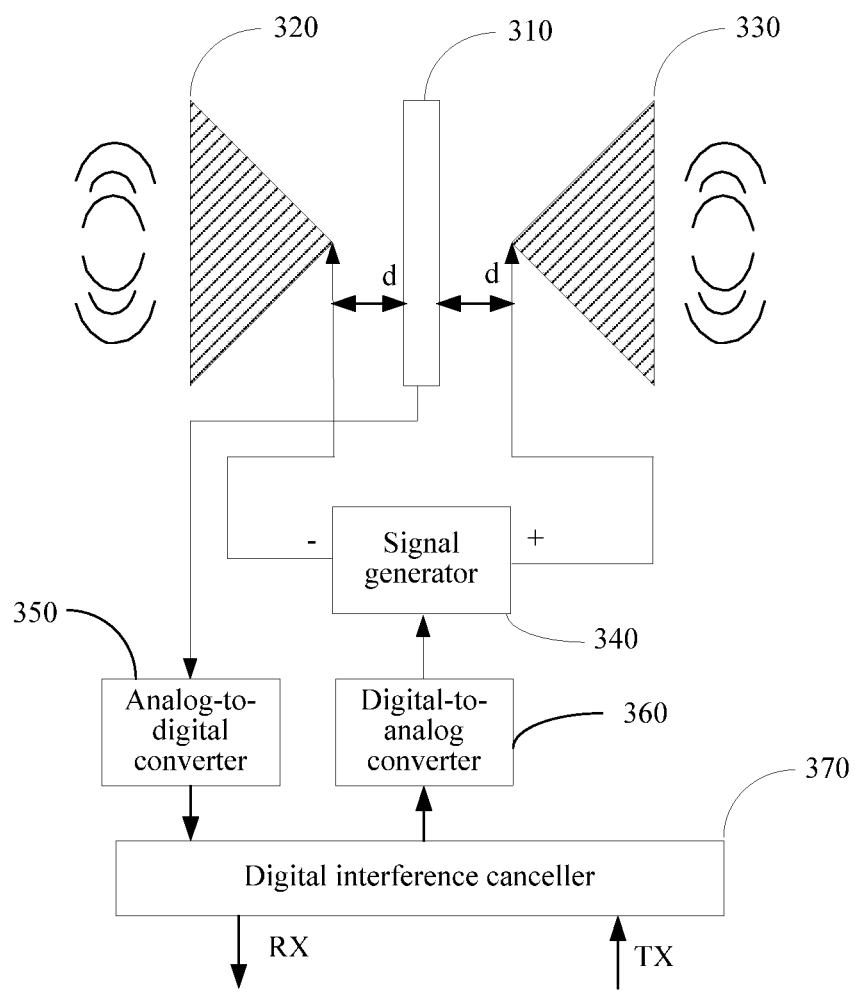
FIG. 4 is a schematic structural diagram of another implementation manner of a full-duplex antenna in this application.

FIG. 4 is a schematic structural diagram of another implementation manner of a full-duplex antenna in this application. The full-duplex antenna in this application can be applied to a small device and includes a receive antenna 310, a first transmit antenna 320, a second transmit antenna 330, a signal generator 340, an analog-to-digital converter 350, a digital-to-analog converter 360, and a digital interference canceller 370. The first transmit antenna 320 is disposed on one side of the receive antenna 310, and the second transmit antenna 330 is disposed on the other side of the receive antenna 310. A distance between the first transmit antenna 320 and the receive antenna 310 is equal to a distance between the second transmit antenna 330 and the receive antenna 310. It may be understood that, "equal to" in that a distance between the second transmit antenna 330 and the receive antenna 310 is equal to a distance between the first transmit antenna 320 and the receive antenna 310 should not be understood as "absolutely equal to" in a mathematical sense but "equal to" that is allowed within an engineering error range.

A first output end of the signal generator 340 is connected to the first transmit antenna 320 by means of a first conducting wire, and a second output end of the signal generator 340 is connected to the second transmit antenna 330 by means of a second conducting wire. One end of the analog-to-digital converter 350 is connected to the receive antenna 310, and the other end is connected to a first end of the digital interference canceller 370. One end of the digital-to-analog converter 360 is connected to an output end of the signal generator 340, and the other end of the digital-to-analog converter 360 is connected to a second end of the digital interference canceller 370. Preferably, the first conducting wire and the second conducting wire have an equal length, so as to ensure that signals that are output by the signal generator 340 to the first transmit antenna 320 and the second transmit antenna 330 remain the same in amplitude and reverse in phase. It may be understood that, "equal" in that the first conducting wire and the second conducting wire have an equal length should not be understood as "absolutely equal" in a mathematical sense but "equal" that is allowed within an engineering error range.

The receive antenna 310 may be a directional antenna and may also be an omnidirectional antenna. The directional antenna mainly sends a signal to or receives a signal from a direction that a lobe of a radiation pattern points to. The omnidirectional antenna can receive signals sent from all directions. A multipath effect occurs in transmission space on a signal sent by a transmit antenna of the other party, and when the other party or the own party is movable (for example, the antenna is disposed inside a mobile terminal), the other party or the own party may be moved to any angle. As the omnidirectional antenna can receive signals sent from all directions, the receive antenna 310 is preferably an omnidirectional antenna.

Figure 5:
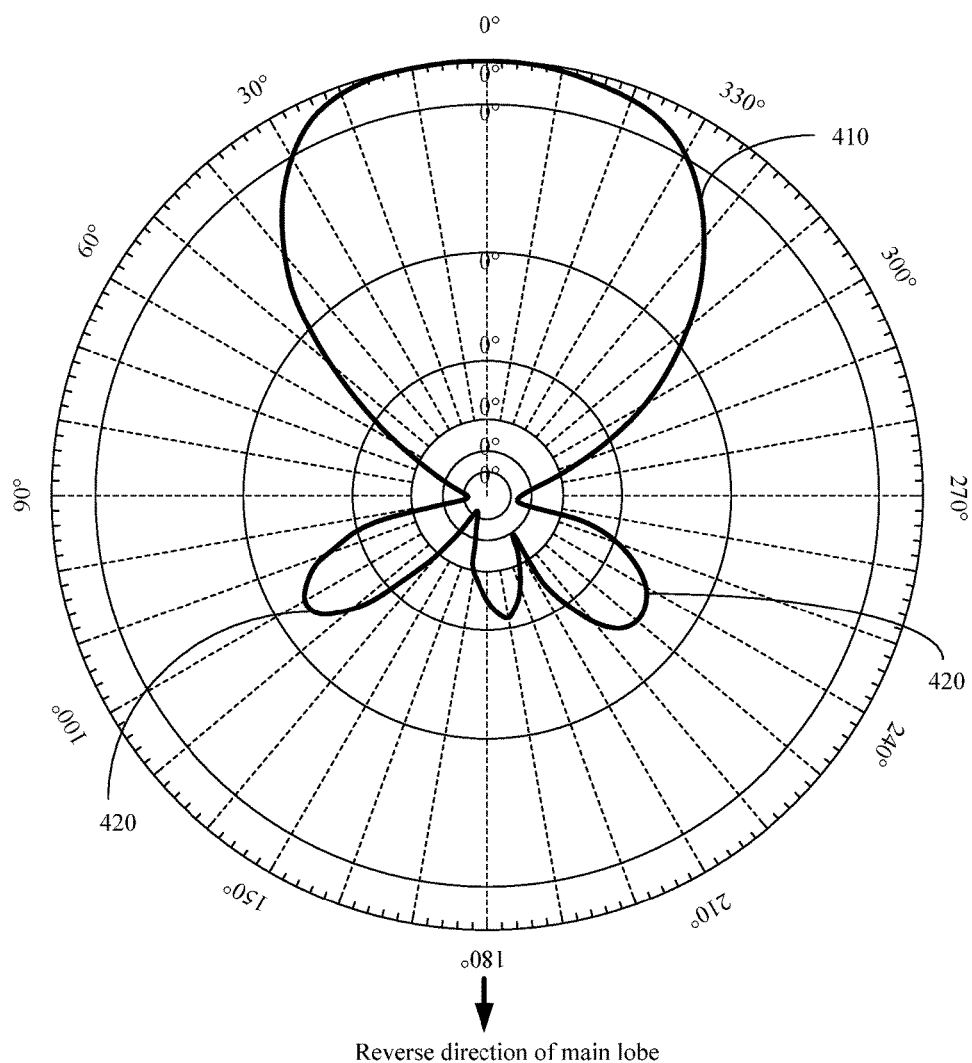
FIG. 5 is a radiation pattern, which has a side lobe, of a transmit antenna of a full-duplex antenna in this application.
Figure 6:
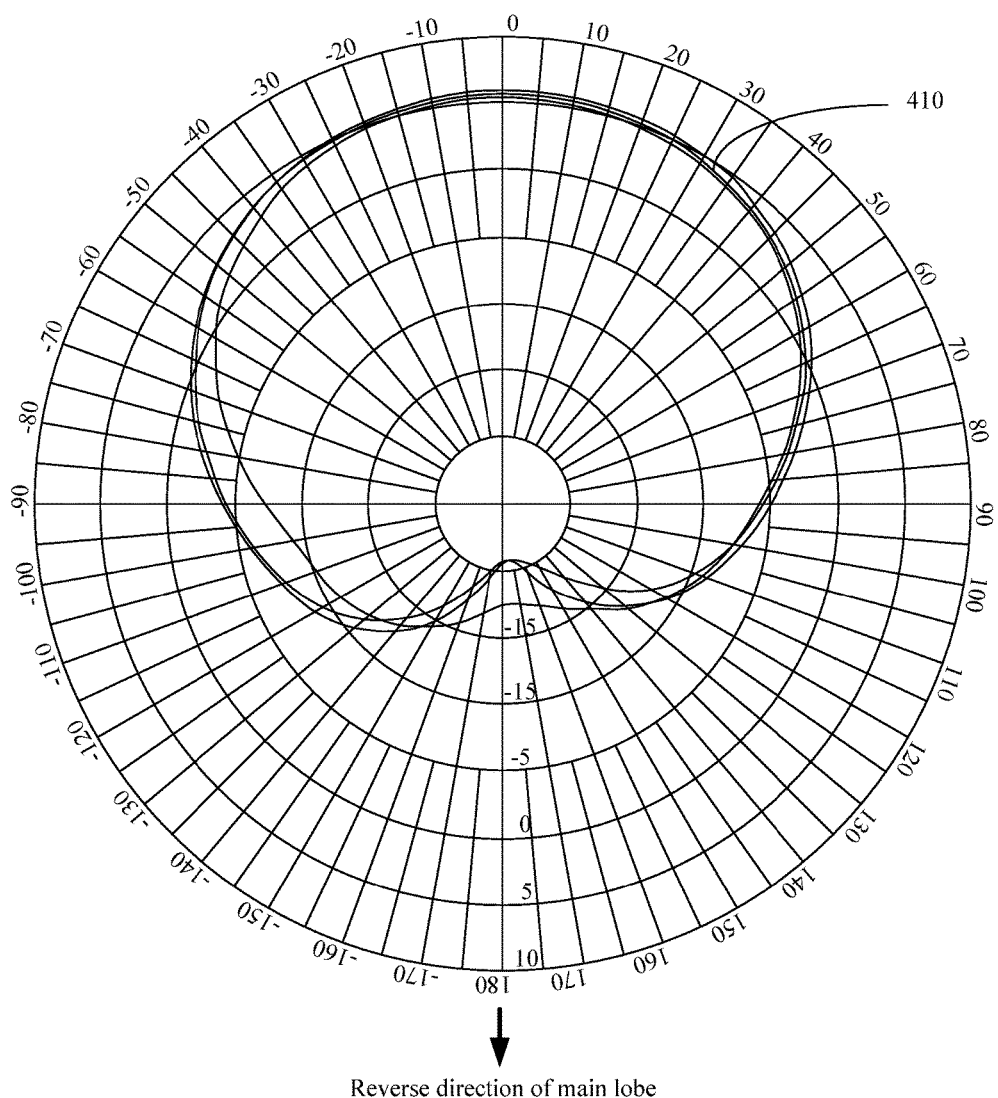
FIG. 6 is a radiation pattern, which has no side lobe, of a transmit antenna of a full-duplex antenna in this application.

FIG. 5 is a radiation pattern, which has a side lobe, of a transmit antenna of a full-duplex antenna in this application, and FIG. 6 is a radiation pattern, which has no side lobe, of a transmit antenna of a full-duplex antenna in this application. Because the first transmit antenna 320 is a directional antenna, the first transmit antenna 320 is disposed on one side of the receive antenna 310, and a reverse direction of a main lobe 410 of a radiation pattern of the first transmit antenna 320 is made to point to the receive antenna 310. Because a directional antenna mainly sends a signal to or receives a signal from a direction that a lobe of a radiation pattern points to, making the reverse direction of the main lobe 410 of the radiation pattern of the first transmit antenna 320 point to the receive antenna 310 can reduce interference from the first transmit antenna 320 to the receive antenna 310. Moreover, because a side lobe 420 causes interference to the receive antenna 310, the radiation pattern that is shown in FIG. 6 and has no side lobe is preferably used.

The second transmit antenna 330 is also a directional antenna. Similarly, the second transmit antenna 330 is disposed on the other side of the receive antenna 310, and a reverse direction of a main lobe of a radiation pattern of the second transmit antenna 330 points to the receive antenna 310. Because a directional antenna mainly sends a signal to or receives a signal from a direction that a lobe of a radiation pattern points to, making the reverse direction of the main lobe of the radiation pattern of the second transmit antenna 330 point to the receive antenna 310 can reduce interference from the second transmit antenna 330 to the receive antenna 310. Moreover, because a side lobe 420 causes interference to the receive antenna 310, a radiation pattern having a relatively few quantity of side lobes that are small is preferably used, and the radiation pattern, which is shown in FIG. 6 and has no side lobe, is preferably used.

The reverse directions of the main lobes of the radiation patterns of the first transmit antenna and the second transmit antenna point to the receive antenna, so that interference cancellation of 10 to 25 dBm can be implemented.

After a radiation direction of the first transmit antenna 320 and a radiation direction of the second transmit antenna 330 are overlapped, omnidirectional radiation can be implemented, so as to ensure that a receive antenna of the other party can receive a transmit signal in any direction of directions of 360 degrees.

A polarization direction in which the receive antenna 310 receives a signal transmitted by the first transmit antenna 320 and a polarization direction in which the receive antenna 310 receives a signal transmitted by the second transmit antenna 330 are perpendicular to each other, thereby implementing interference cancellation of 10 dBm. Because oscillation of an electromagnetic wave has a direction, and when the polarization directions are perpendicular to each other, there is little energy to cause resonance of the receive antenna 310, a signal received by the receive antenna 310 has minimum energy.

The signal generator 340 may be a Barron converter, configured to generate two channels of transmit signals having a same amplitude and reverse phases and separately send the two channels of transmit signals to the first transmit antenna 320 and the second transmit antenna 330. Because the distance from the first transmit antenna 320 to the receive antenna 310 is equal to the distance from the second transmit antenna 330 to the receive antenna 310, phases of a signal sent by the first transmit antenna 320 and a signal sent by the second transmit antenna 330 are exactly reverse at the receive antenna 310, thereby implementing cancellation. Interference cancellation of 30 dBm occurs at the receive antenna 310 on the signals sent by the first transmit antenna 320 and the second transmit antenna 330.

However, the distance from the first transmit antenna 320 to the receive antenna 310 and the distance from the second transmit antenna 330 to the receive antenna 310 are not necessarily the same. Moreover, a multipath effect occurs in transmission space on the signal sent by the first transmit antenna 320 and the signal sent by the second transmit antenna 330 and the signals have different phases when arriving at the receive antenna 310. Alternatively, when a receiving party is in a forward direction of one of the transmit antennas, a strength of a received signal sent by the antenna is greater than a strength of a received signal sent by the other transmit antenna. Therefore, when the two transmit antennas send two channels of transmit signals having a same amplitude and reverse phases, the receive antenna of the other party is not affected.

The analog-to-digital converter 350 is configured to convert an analog receive signal received by the receive antenna 310 into a digital receive signal and send the digital receive signal to the digital interference canceller 370.

The digital-to-analog converter 360 receives a digital modulation signal sent by the digital interference canceller 370, and converts the digital transmit signal into an analog transmit signal, and sends the analog transmit signal to the signal generator 340.

The digital interference canceller 370 is configured to cancel interference signals received by the receive antenna from the first transmit antenna 320 and the second transmit antenna 330. Although in the foregoing analog part, various methods are used to implement mutual cancellation of the signals transmitted by the first transmit antenna 320 and the second transmit antenna 330, some signals are still received as interference signals by the receive antenna 310 together with a signal sent by the other party. In this case, the interference signals may be canceled by means of the digital interference canceller 370. The digital interference canceller can implement interference cancellation of 35 dBm. The digital interference canceller 370 may be implemented by using a processor having a fast computing capability, such as a digital signal processor.

Figure 7:
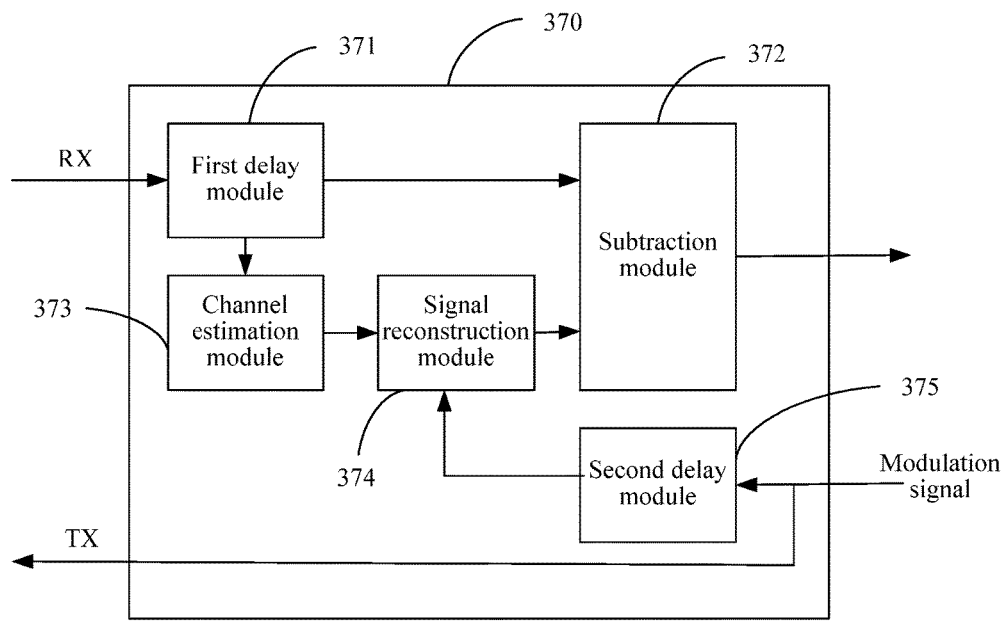
FIG. 7 is a schematic structural diagram of an implementation manner of a digital interference canceller of a full-duplex antenna in this application.

FIG. 7 is a schematic structural diagram of an implementation manner of a digital interference canceller of a full-duplex antenna in this application. The digital interference canceller 370 in this implementation manner includes a first delay module 371, a subtraction module 372, channel estimation module 373, a signal reconstruction module 374, and a second delay module 375.

Signals received by the receive antenna 310 not only include the signal sent by the transmit antenna of the other party, but also includes the signals sent by the first transmit antenna 320 and the second transmit antenna 330 of the own party. The signal sent by the transmit antenna of the other party is a signal desired to be received and is a wanted signal. The signals sent by the first transmit antenna 320 and the second transmit antenna 330 are signals that are not desired to be received and are interference signals.

Because the signal sent by the transmit antenna of the other party and the signals sent by the first transmit antenna 320 and the second transmit antenna 330 of the own party are mixed together, the interference signals from the first transmit antenna 320 and the second transmit antenna 330 cannot be learned directly. Therefore, if the interference signals from the first transmit antenna 320 and the second transmit antenna 330 are to be removed from the signals received by the receive antenna 310, the channel estimation module 373 must be used first to estimate a channel, so as to obtain channel estimation. Then, the signal reconstruction module 374 is used to reconstruct, according to the channel estimation and a modulation signal that is used by the first transmit antenna 320 and the second transmit antenna 330 for transmission, the interference signals received by the receive antenna 310.

Finally, the subtraction module 372 is used to subtract the interference signals, which are obtained by means of reconstruction, from the signals received by the receive antenna 310, thereby canceling the interference signals. Moreover, a time cost when the modulation signal is transmitted in space and then is received by the receive antenna 310 is different from a time cost when the modulation signal is transmitted in the digital interference canceller 370. Therefore, the first delay module 371 and the second delay module 375 must be used for delay, to ensure that a signal received by the receive antenna 310 and the interference signals obtained by the signal reconstruction module 374 by means of reconstruction simultaneously arrive at the subtraction module 372.

According to the foregoing solution, in an analog signal part, a first transmit antenna and a second transmit antenna are set to be directional antennas, and reverse directions of main lobes of radiation patterns of the two transmit antennas point to a receive antenna, thereby implementing interference cancellation of 10 to 25 dBm. A polarization direction in which the receive antenna receives a signal transmitted by the first transmit antenna and a polarization direction in which the receive antenna receives a signal transmitted by the second transmit antenna are perpendicular to each other, thereby implementing interference cancellation of 10 dBm.

A signal generator generates two signals having the same amplitude and reverse phases, and separately sends the two signals by means of the first transmit antenna and the second transmit antenna. Moreover, a distance between the first transmit antenna and the receive antenna is equal to a distance between the second transmit antenna and the receive antenna. Interference cancellation of 30 dBm occurs at the receive antenna on the signals sent by the first transmit antenna and the second transmit antenna. In a digital signal part, the digital interference canceller can implement interference cancellation of 35 dBm. Therefore, interference cancellation of 105 to 110 dBm can be implemented in total. Therefore, bidirectional communication can be implemented in a same timeslot and at a same frequency.

Moreover, the distances from the two transmit antennas to the receive antenna can be quite short, and added components, that is, the signal generator and the digital interference canceller, are chip-level. Therefore, the size of the full-duplex antenna can be quite small, and the full-duplex antenna can be applied to a small device. Moreover, the distance between the first transmit antenna and the receive antenna is made to be equal to the distance between the second transmit antenna and the receive antenna, and the signals sent by the first transmit antenna and the second transmit antenna have the same amplitude and the reverse phases, so that when a frequency changes, a distance of the antennas does not need to be reset. Moreover, an effect of mutual cancellation can also be achieved for a wideband signal, so that the full-duplex antenna is also applicable to the wideband signal.

Figure 8:
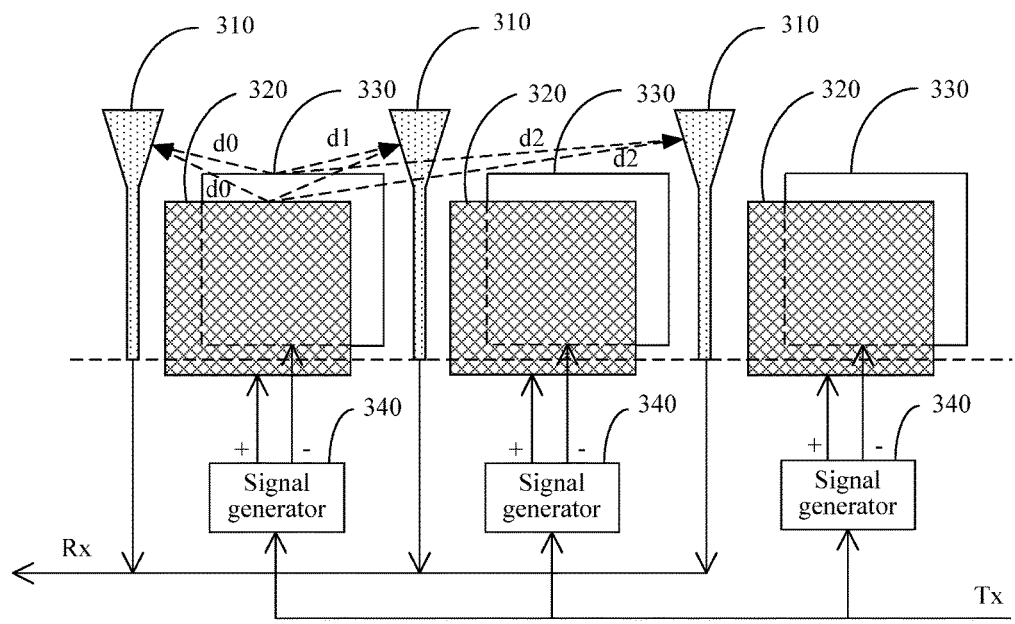
FIG. 8 is a schematic structural diagram of still another implementation manner of a full-duplex antenna in this application.

FIG. 8 is a schematic structural diagram of still another implementation manner of a full-duplex antenna in this application. Different from the full-duplex antenna shown in FIG. 4, the full-duplex antenna in FIG. 8 includes multiple groups of receive and transmit channels, where each group of receive and transmit channel includes a receive antenna 310, a first transmit antenna 320, a second transmit antenna 330, and a signal generator 340, and settings of the receive antenna 310, the first transmit antenna 320, the second transmit antenna 330, and the signal generator 340 in each group of receive and transmit channel (including a connection relationship, a radiation direction setting, distances from the first transmit antenna 320 and the second transmit antenna 330 to the receive antenna 310, a distance between a first conducting wire and a second conducting wire, and the like) are the same as those in the other groups of receive and transmit channels, which are not further described herein.

Moreover, a first end of a digital interference canceller is configured to receive a receive signal that is output by the receive antenna in each group, and a second end of the digital interference canceller is configured to output a transmit signal to the signal generator that is in each group. Moreover, distances from the first transmit antenna and the second transmit antenna that are in a same group of receive and transmit channel to any receive antenna are the same, for example, a distance (d0) from a first transmit antenna 320 in a first group to a receive antenna 310 in the first group is equal to a distance (d0) from a second transmit antenna 330 in the first group to the receive antenna 310 in the first group; a distance (d1) from the first transmit antenna 320 in the first group to a receive antenna 310 in a second group is equal to a distance (d1) from the second transmit antenna 330 in the first group to the receive antenna 310 in the second group; and a distance (d2) from the first transmit antenna 320 in the first group to a receive antenna 310 in a third group is equal to a distance (d2) from the second transmit antenna 330 in the first group to the receive antenna 310 in the third group, to ensure that the first transmit antenna 320 and the second transmit antenna 330 that are in each group do not affect a receive antenna 310 in any group.

If the full-duplex antenna in this application is used, when a transmit antenna sends a signal to a receive antenna of the other party, the sent signal is received by only the receive antenna of the other party and does not affect a receive antenna of the own party and the receive antenna can receive data normally, so that full duplex can be implemented at a same frequency and in a same timeslot, and utilization of a spectrum is greatly improved. Moreover, distances from two transmit antennas to a receive antenna can be quite short, and added components, that is, a signal generator and a digital interference canceller, are chip-level. Therefore, the size of the full-duplex antenna can be small, and the full-duplex antenna can be applied to a small device. Moreover, a distance between a first transmit antenna and a receive antenna is made to be equal to a distance between a second transmit antenna and the receive antenna, and signals sent by the first transmit antenna and the second transmit antenna have a same amplitude and reverse phases, so that when a frequency changes, a distance of the antennas does not need to be reset. Moreover, an effect of mutual cancellation can also be achieved for a wideband signal, so that the full-duplex antenna is also applicable to the wideband signal.

This application further provides a mobile terminal, including the full-duplex antenna described in the foregoing implementation manners. For details, refer to FIG. 3 to FIG. 8 and related description, which are not repeated herein.

In the several implementation manners provided in this application, it should be understood that the disclosed system, apparatus, and method may be implemented in other manners. For example, the described apparatus embodiment is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the implementation manners.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The software product is stored in a storage medium and includes several instructions for instructing a computer device (which may be a personal computer, a server, or a network device) or a processor (processor) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

What is claimed is:

1. A full-duplex antenna, comprising:
   a receive antenna;
   a first transmit antenna disposed on a first side of the receive antenna, wherein the first transmit antenna is a directional antenna and wherein a reverse direction of a main lobe of a radiation pattern of the first transmit antenna points to the receive antenna; and
   a second transmit antenna disposed on a second side of the receive antenna, the second side opposite the first side, wherein a distance between the second transmit antenna and the receive antenna is equal to a distance between the first transmit antenna and the receive antenna, wherein the second transmit antenna is a directional antenna, and wherein a reverse direction of a main lobe of a radiation pattern of the second transmit antenna points to the receive antenna;
   wherein a first polarization direction in which the receive antenna receives a signal transmitted by the first transmit antenna and a second polarization direction in which the receive antenna receives a signal transmitted by the second transmit antenna are perpendicular to each other.

2. The full-duplex antenna according to claim 1, further comprising a signal generator, wherein a first output end of the signal generator is connected to the first transmit antenna by a first conducting wire, wherein a second output end of the signal generator is connected to the second transmit antenna by a second conducting wire, and wherein the signal generator is configured to generate two channels of transmit signals having the same amplitude and reverse phases and to separately send the two channels of transmit signals to the first transmit antenna and the second transmit antenna.

3. The full-duplex antenna according to claim 2, wherein the first conducting wire and the second conducting wire have an equal length.

4. The full-duplex antenna according to claim 2, further comprising a digital interference canceller, which is configured to cancel interference signals received by the receive antenna from the first transmit antenna and the second transmit antenna.

5. The full-duplex antenna according to claim 4, wherein the full-duplex antenna comprises multiple groups of receive and transmit channels, wherein each group of receive and transmit channel comprises a respective receive antenna, a respective first transmit antenna, a respective second transmit antenna, and a respective signal generator, wherein a first end of the digital interference canceller is configured to receive a receive signal that is output by the respective receive antenna in each group, a second end of the digital interference canceller is configured to output a transmit signal to the respective signal generator that is in each group, and distances from the respective first transmit antenna and the respective second transmit antenna that are in the same group of receive and transmit channel to any receive antenna are the same.

6. The full-duplex antenna according to claim 4, further comprising an analog-to-digital converter, wherein a first end of the analog-to-digital converter is connected to the receive antenna, and a second end of the analog-to-digital converter is connected to the digital interference canceller, the analog-to-digital converter being configured to convert an analog receive signal received by the receive antenna into a digital receive signal and to send the digital receive signal to the digital interference canceller.

7. The full-duplex antenna according to claim 4, further comprises a digital-to-analog converter, wherein a first end of the digital-to-analog converter is connected to the signal generator, and a second end of the digital-to-analog converter is connected to the digital interference canceller, the digital-to-analog converter being configured to convert a digital transmit signal sent by the digital interference canceller into an analog transmit signal and to send the analog transmit signal to the signal generator.

8. The full-duplex antenna according to claim 1, wherein the radiation pattern of the first transmit antenna has no side lobe and wherein the second transmit antenna has no side lobe.

9. The full-duplex antenna according to claim 1, wherein the full-duplex antenna is configured to implement omnidirectional radiation after a direction of the main lobe of the radiation pattern of the first transmit antenna and a direction of the main lobe of the radiation pattern of the second transmit antenna are overlapped, wherein the omnidirectional radiation enables a transmit signal to be received in any direction of 360 degrees.

10. A mobile terminal, comprising a full-duplex antenna that comprises:
  a receive antenna;
  a first transmit antenna disposed on a first side of the receive antenna, wherein the first transmit antenna is a directional antenna and wherein a reverse direction of a main lobe of a radiation pattern of the first transmit antenna points to the receive antenna; and
  a second transmit antenna, disposed on a second side of the receive antenna, the second side opposite the first side, wherein a distance between the second transmit antenna and the receive antenna is equal to a distance between the first transmit antenna and the receive antenna, wherein the second transmit antenna is a directional antenna, and wherein a reverse direction of a main lobe of a radiation pattern of the second transmit antenna points to the receive antenna;
  wherein a first polarization direction in which the receive antenna receives a signal transmitted by the first transmit antenna and a second polarization direction in which the receive antenna receives a signal transmitted by the second transmit antenna are perpendicular to each other.

11. The mobile terminal according to claim 10, further comprising a signal generator, wherein a first output end of the signal generator is connected to the first transmit antenna by a first conducting wire, wherein a second output end of the signal generator is connected to the second transmit antenna by a second conducting wire, and wherein the signal generator is configured to generate two channels of transmit signals having the same amplitude and reverse phases and to separately send the two channels of transmit signals to the first transmit antenna and the second transmit antenna.

12. The mobile terminal according to claim 11, wherein the first conducting wire and the second conducting wire have an equal length.

13. The mobile terminal according to claim 11, further comprising a digital interference canceler, which is configured to cancel interference signals received by the receive antenna from the first transmit antenna and the second transmit antenna.

14. The mobile terminal according to claim 13, wherein the full-duplex antenna comprises multiple groups of receive and transmit channels, wherein each group of receive and transmit channel comprises a respective receive antenna, a respective first transmit antenna, a respective second transmit antenna, and a respective signal generator, wherein a first end of the digital interference canceller is configured to receive a receive signal that is output by the respective receive antenna in each group, a second end of the digital interference canceller is configured to output a transmit signal to the respective signal generator that is in each group, and distances from the respective first transmit antenna and the respective second transmit antenna that are in the same group of receive and transmit channel to any receive antenna are the same.

15. The mobile terminal according to claim 13, further comprising an analog-to-digital converter, wherein a first end of the analog-to-digital converter is connected to the receive antenna, and a second end of the analog-to-digital converter is connected to the digital interference canceller, the analog-to-digital converter being configured to convert an analog receive signal received by the receive antenna into a digital receive signal and to send the digital receive signal to the digital interference canceller.

16. The mobile terminal according to claim 13, further comprises a digital-to-analog converter, wherein a first end of the digital-to-analog converter is connected to the signal generator, and a second end of the digital-to-analog converter is connected to the digital interference canceller, the digital-to-analog converter being configured to convert a digital transmit signal sent by the digital interference canceller into an analog transmit signal and to send the analog transmit signal to the signal generator.

17. The mobile terminal according to claim 10, wherein the radiation pattern of the first transmit antenna has no side lobe and wherein the second transmit antenna has no side lobe.

18. The mobile terminal according to claim 10, wherein the full-duplex antenna is configured to implement omnidirectional radiation after a direction of the main lobe of the radiation pattern of the first transmit antenna and a direction of the main lobe of the radiation pattern of the second transmit antenna are overlapped, wherein the omnidirectional radiation enables a transmit signal to be received in any direction of 360 degrees.

19. A full-duplex antenna, comprising:
  a receive antenna;
  a first transmit antenna disposed on a first side of the receive antenna, wherein the first transmit antenna is a directional antenna and wherein a reverse direction of a main lobe of a radiation pattern of the first transmit antenna points to the receive antenna; and
  a second transmit antenna disposed on a second side of the receive antenna, the second side opposite the first side, wherein a distance between the second transmit antenna and the receive antenna is equal to a distance between the first transmit antenna and the receive antenna, wherein the second transmit antenna is a directional antenna, and wherein a reverse direction of a main lobe of a radiation pattern of the second transmit antenna points to the receive antenna;

wherein the radiation pattern of the first transmit antenna has no side lobe and wherein the second transmit antenna has no side lobe.

20. A full-duplex antenna, comprising:

a receive antenna;

a first transmit antenna disposed on a first side of the receive antenna, wherein the first transmit antenna is a directional antenna and wherein a reverse direction of a main lobe of a radiation pattern of the first transmit antenna points to the receive antenna; and a second transmit antenna disposed on a second side of the receive antenna, the second side opposite the first side, wherein a distance between the second transmit antenna and the receive antenna is equal to a distance between the first transmit antenna and the receive antenna, wherein the second transmit antenna is a directional antenna, and wherein a reverse direction of a main lobe of a radiation pattern of the second transmit antenna points to the receive antenna;

wherein the full-duplex antenna is configured to implement omnidirectional radiation after a direction of the main lobe of the radiation pattern of the first transmit antenna and a direction of the main lobe of the radiation pattern of the second transmit antenna are overlapped, wherein the omnidirectional radiation enables a transmit signal to be received in any direction of 360 degrees.

* * * * *